Figure 1:
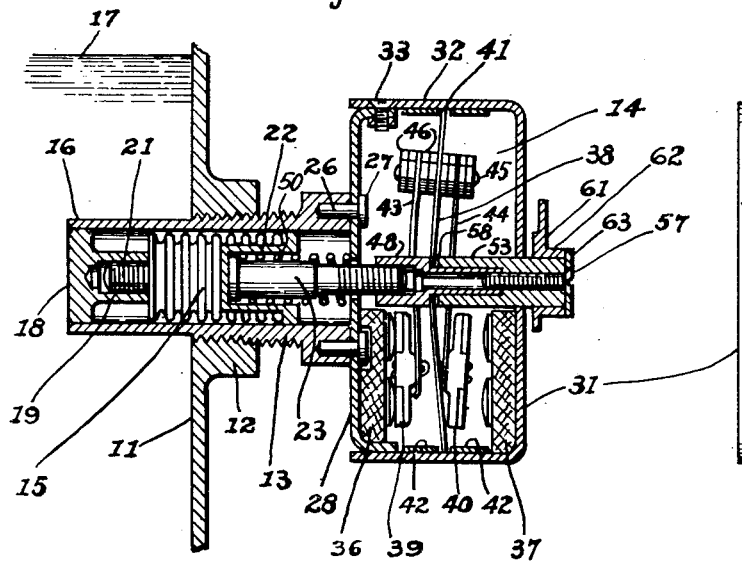

Feb. 1, 1949.   S. S. MINNICH   2,460,762
THERMOSTATIC SWITCH
Filed Feb. 2, 1946   2 Sheets-Sheet 1

INVENTOR.
Stehman S. Minnich
BY Frederic B. Schramm
Attorney

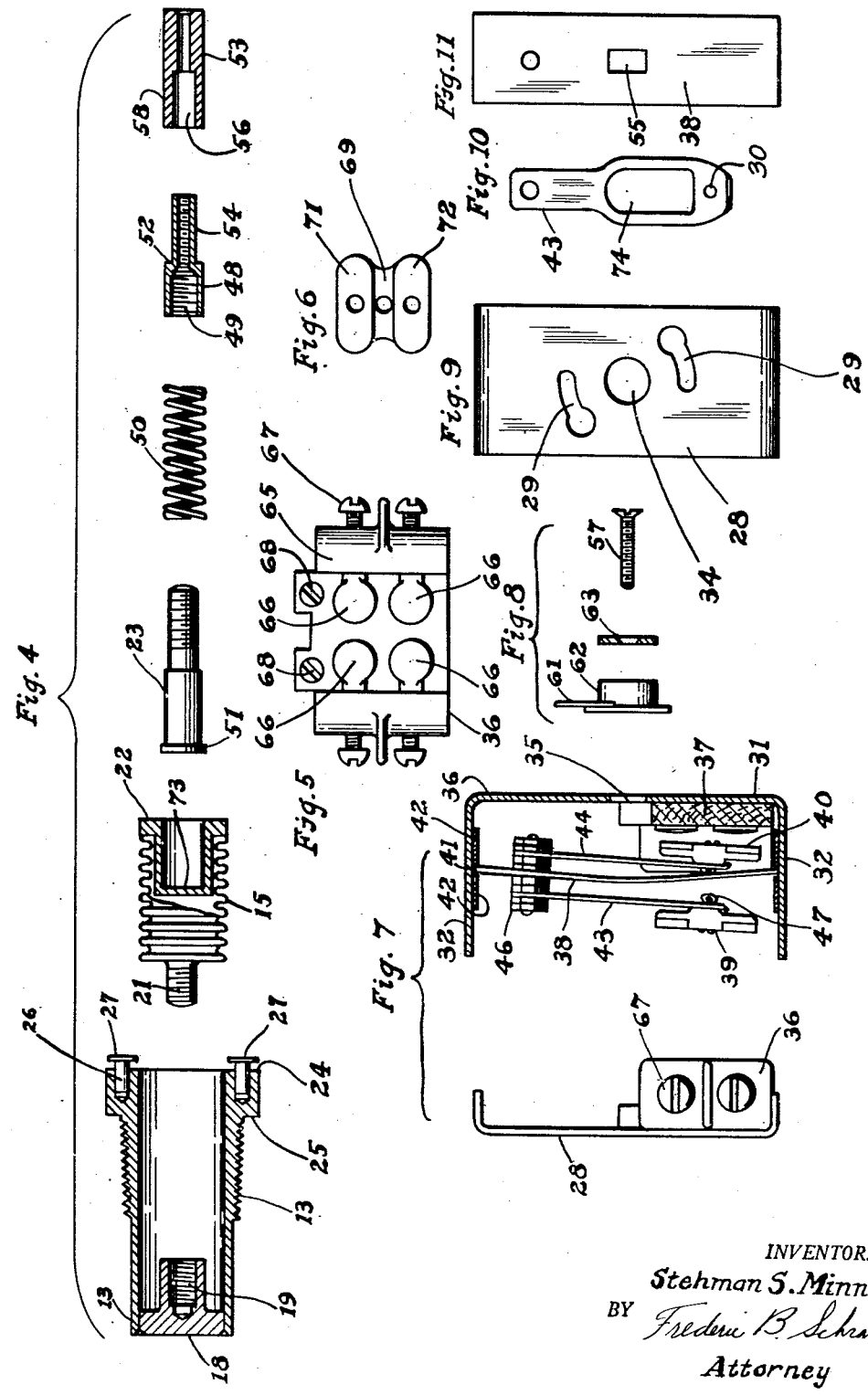

Patented Feb. 1, 1949

2,460,762

UNITED STATES PATENT OFFICE 2,460,762

THERMOSTATIC SWITCH

Stehman S. Minnich, Cleveland, Ohio, assignor to The Patrol Valve Company, Cleveland, Ohio, a corporation of Ohio Application February 2, 1946, Serial No. 645,202

14 Claims. (Cl. 200—140)

My invention relates to temperature controlling and responsive devices.

It is an object of my invention to provide an improved temperature control for heating devices such as water heaters, for example, and a further object is to provide an improved thermostatic switch.

A further object is to provide improved regulation or control of an electric current consuming device.

Another object of the invention is to provide mechanism for the operation of a switch by a liquid filled bellows and to cause functioning of the switch mechanism in the direct relation to the direction of travel of the bellows.

A further object is to provide a limit control, especially for a device in which heat is supplied. Another object is to provide an improved electric cut-out switch.

In addition, it is an object to provide limit controls and cut-out devices which may readily be converted into temperature regulating or control devices or vice versa.

An additional object is to provide a thermostatic mechanism adapted to have a very narrow spread between opening and closing temperatures.

A further object is to provide a limit control or cut-out which may readily be set manually, and it is an object to avoid the use of catches, hooks, triggers, and the like to intercept or hold the mechanism in an open position.

Still another object is to provide for a slotted or rotary bayonet type of attachment between a switch mechanism and a temperature-responsive mechanism in a thermostatic switch or cut-out. A further object is to provide easy removability of a switch mechanism without disturbance of an operating bellows, its housing or the internal mechanism of the switch. Furthermore, an object is to provide for easy removability of both a switch and a bellows without disturbing the bellows housing of the apparatus in which the temperature is being controlled or removing the bellows housing from its original location or position such as in a water tank, for example.

Still another object of the invention is to provide a switch, a bellows, and a bellows housing as separate units which may readily be combined or securely interconnected in a single unit.

Still another object is to provide quick-lock mechanism for securing the parts of a thermostatic regulator or cut-out.

Still another object is to render the operating bellows in a temperature control or responsive device free to expand or contract from either end or in both directions simultaneously.

Still another object of the invention is to provide an alarm cut-out to close electrical contacts to operate alarm bells, warning lights or the like in the event of the occurrence of an excessive temperature in an apparatus to be safeguarded.

Other and further objects and features and advantages of the invention will become apparent as the description proceeds.

In carrying out the invention in accordance with the preferred form thereof, I provide a switch frame, a bellows housing to which it is adapted to be secured by a quick-lock mechanism, and a liquid-filled bellows for operating the switch mechanism. The bellows housing is adapted to be mounted in apparatus to be regulated, controlled or safeguarded in such a manner as to subject the bellows to the control temperature. In case of the control of water heaters, for example, the bellows housing is constructed in the form of a well with a threaded circular outer wall adapted to be threaded into a spud formed in the water heater tank so as to project the well into the mass of water being heated or stored.

The switch frame is provided with a snap-action leaf-spring in the form of a column spring placed under compression, so as to be bowed in one or the other of two positions of rest. A rod or stem assembly or linkage moving axially with respect to the well or bellows housing is provided for operating the leaf-spring in response to expansion or contraction of the liquid filled bellows. Suitable switch contact means or other mechanism to be operated in response to the temperature variations is directly connected to or linked to the leaf-spring.

Figure 2:
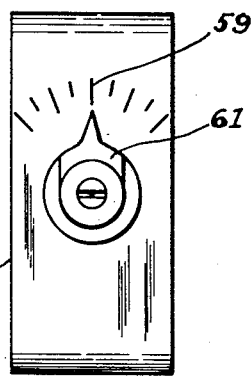
Figure 3:
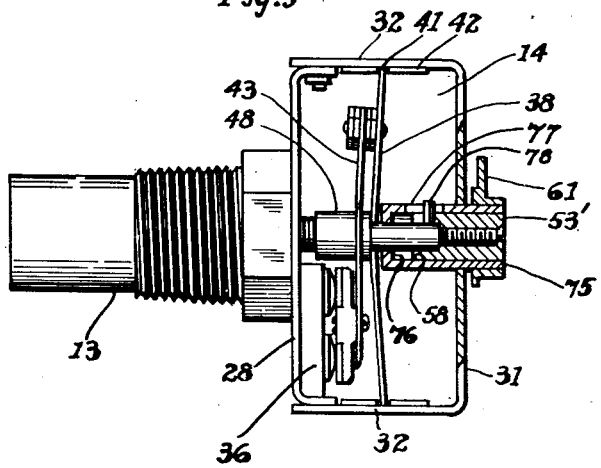

A better understanding of the invention will be afforded by the following detailed description considered in conjunction with the accompanying drawing in which Fig. 1 is a side elevation, mainly in cross-section, of a thermostatic double-throw switch forming an embodiment of my invention. Fig. 2 is an end elevation of the apparatus of Fig. 1. Fig. 3 is a side elevation of a thermal cut-out employing the driving mechanism of the apparatus of Fig. 1. Fig. 4 is an exploded view of the bellows housing, bellows and switch operating linkage of the apparatus of Fig. 1. Fig. 5 is a detail view of one of the stationary contact blocks of the electric switch mechanism of the apparatus of Fig. 1. Fig. 6 is a detail view of one of the movable contact blocks adapted to cooperate with the stationary block illustrated in Fig. 5. Fig. 7 is an exploded view of the electric switch mechanism and frame of the apparatus of Fig. 1. Fig. 8 is an exploded view of the adjustment indicating and securing mechanism of the apparatus of Fig. 1. Fig. 9 is a detail view of a piece serving both as a plate and locking device for the switch frame, illustrated in Fig. 7. Fig. 10 is a detail view of one of the movable contact carrying arms of the apparatus of Fig. 1, and Fig. 11 is a detail view of leaf-spring employed in the apparatus of Fig. 1.

Like reference characters are utilized throughout the drawing to utilize like parts.

Although my invention is not limited to the temperature-responsive regulation or control of electrical or current consuming apparatus nor limited to regulation or control of water heaters, for the sake of illustration, the temperature-responsive device shown in Fig. 1 is shown as mounted in a fragmentarily represented water heater tank 11 having a spud 12 adapted to receive a thermostat well or bellows casing 13. A switch mechanism 14 is secured to the bellows well 13, and a bellows 15 is mounted within the well 13. Preferably the spud 12 and a portion of the outer surface of the well or bellows housing 13 are provided with a pipe thread to make a water-proof joint between the well 13 and the tank 11, with the inner end 16 of the well 13 projecting into the mass of water 17 in the tank 11. The well 13 is so constructed as to be closed at its inner end 16 and is preferably composed of a relatively good heat conductor, such as brass, copper or other suitable metal. In the form shown, by way of illustration, there is a closure member 18 soldered or brazed at the inner end 16 so as to form a tight joint and seal, and preferably the end piece 18 is formed with an internally threaded hollow stem or tube 19 or other suitable means for removably securing the bellows 15 within the inner end of the well 13 and making good thermal contact therewith.

The bellows 15, as illustrated, has a threaded stud 21 secured to the inner end thereof which is adapted to be threaded into the hollow stem 19. It is to be understood that the bellows 15 is wholly closed and sealed with a suitable temperature-responsive expansible and contractible medium therein. Preferably the medium is one which remains a liquid throughout the operating range of temperature within which the apparatus to be controlled may operate. Tetrachlor-diphenyl, for example, may be employed for oven controls where the temperature reaches 650° F. For lower maximum temperatures such as 150° F. or 200° F., which might be attained in water heater regulators or emergency cut-outs, respectively, alcohol, ether, acetone, water or a mixture may be employed satisfactorily. Preferably the outer end of the bellows 15 is formed with a concave or cup-shaped closure 22 so as to be adapted to receive a switch operating stem or push rod 23.

Suitable means are provided for detachably securing the switch mechanism 14 to the bellows casing 13 in operable relationship to the bellows 15 at the open end of the casing. The outer open end 24 of the bellows casing 13 is formed with a reinforcing flange 25 in which a plurality of locking pins 26 are rigidly secured having heads 27. To cooperate with the open end 24 of the bellows casing 13 and the securing heads 27, the frame of the switch mechanism 14 includes a plate 28, specifically illustrated in Fig. 9, having arcuate "button-hole" or "key-hole" slots 29, the enlarged ends of which are adapted to fit over the locking-pin heads 27 and the narrowed ends of which are adapted to secure the plate 28 to the housing 13 upon slight rotary movement of the mechanism 14 including the plate 28.

The switch mechanism 14 is provided with a frame comprising, together with the plate 28, a second plate 31 suitably secured to the plate 28. Preferably the plate 31 is U-shaped with arms 32 secured to the ends of the plate 28 in any suitable manner as by means of stove bolts 33 and serving also as upper and lower end members of the switch frame. The plates 28 and 31 are provided with switch operating rod receiving openings 34 and 35 respectively.

To form a double-throw, double-break, double-pole switch, stationary contact blocks 36 and 37 are mounted within the frame 14, and a leaf-spring 38 is transversely mounted in the frame 14 carrying a pair of movable contact blocks 39 and 40 cooperating with the stationary contact blocks 36 and 37 respectively. The leaf-spring 38 is arranged as a column spring stressed by end pressure to cause it to bow in one direction or the other toward or away from the bellows 15. To this end slots 41 are provided in the switch frame cross-arms 32 to receive the ends of the leaf-spring 38. Such slots 41 may be formed by brazing or soldering or otherwise securing spaced blocks 42 to the inner surface of the cross-arms 32.

Preferably the movable switch blocks 39 and 40 are secured to the leaf-spring 38 by resilient switch arms or blades 43 and 44, respectively, also composed of resilient spring strip material. As illustrated, the upper ends of the switch arms 43 and 44 are secured to the leaf-spring 38 near the upper end thereof by means of a bolt 45, with nuts 46 serving both for securement and spacing. In the arrangement illustrated, the movable switch blocks 39 and 40 are secured to the lower ends of the switch blades 43 and 44, preferably, with a pivotal mounting. The pivotal mounting is provided by split rivets 47 making an extreme loose fit in openings 30 (Fig. 10) in the lower ends of the switch arms 43 and 44 to enable the movable switch blocks 39 and 40 to adjust themselves for good contact with the stationary switch blocks 36 and 37, respectively.

An operating connection is provided between the bellows 15 and the leaf-spring 38 preferably taking the form of a push rod or stem assembly comprising two or more threaded parts for adjustment of operating temperature. The push rod assembly in the form of switch, illustrated, comprises the push rod 23 and the connecting stem 48 having a threaded bore 49 screwed upon the end of the push rod 23 and rotatable to provide adjustment of the axial length of the portion of the push rod assembly between a head 51 formed on the rod 23 and a shoulder 52 formed on the connecting rod or stem 48. The head 51 is adapted to bear against the bellows 15, and the shoulder 52 is adapted to bear against the inner surface of the leaf-spring 38. A spring 50 is provided for returning the push rod when the bellows 13 contracts. It is made strong enough to overcome the leaf-spring 38 when the bellows contracts.

In order to enable adjustment of the effective length of the push rod assembly and, accordingly, to enable the adjustment of the operative temperature of the switch mechanism from outside the switch frame 14, the push rod assembly is preferably arranged to project from the frame 14 through the outer frame plate 31. For ease in assembly, this is accomplished by providing a separable adjustment stem or dial stem 53 projecting through the opening 35 in the plate 31. As illustrated, the connecting stem 48 is provided with a portion of reduced diameter 54 projecting through an opening 55 in the leaf-spring 38, and the adjustment stem 53 is provided with a bore 56 adapted to receive the portion 54 of the connecting stem 48. The reduced diameter portion or neck 54 is also provided with an internally threaded bore, and a screw or other suitable means 57 is provided for securing the stem 53 to the connecting stem 48, the dimensions being so chosen so the inner end of the dial stem 53 forms a shoulder 58 spaced from the connecting stem shoulder 52 and adapted to bear against the outer surface of the leaf-spring 38.

For providing an indication of the temperature at which the apparatus is adjusted to operate, an indicating pointer, and a graduated scale are provided—one of which is secured to the plate 31 and the other to the dial stem 53. For example, in the arrangement illustrated, a scale or gradution marks 59 are placed upon the outer surface of the plate 31, and an indicating pointer 61 is secured to the end of the dial stem 53. The pointer 61, as shown, has a collar 62 adapted to fit over the dial stem 53 and is preferably provided with a cap portion 63 adapted to be secured to the end of the dial stem 53 by means of the fastening screw 57.

The dimensions of the switch-returning spring 50, the opening 34 in the frame plate 28, and the head are so chosen that the spring abuts the plate 28 and the head 51, holding the head 51 against the bellows 15. The dimensions are also such that expansion of the fluid in the bellows 15 with rising temperature, expanding the bellows 15 axially, compresses the spring 50.

Where double-break, double-pole switch operation is desired, each of the stationary switch blocks 36, as shown in greater detail in Fig. 5, comprises an insulating block member 65 composed of ceramic or plastic materials such as porcelain or a phenolic composition, for example, into which four stationary contact pieces 66 have been molded. As will be understood by those skilled in the art, the contact pieces 66 are formed with threaded block portions adapted to receive terminal screws 67 for making connections with four different lead wires. Suitable fastening screws 68 are provided for securing the block in the switch frame 14.

Each of the movable contact blocks 39 and 40 comprises a bridge or insulator 69 composed of suitable insulating material such as a phenolic condensation product, for example, to which a pair of metallic contact pieces 71 and 72 has been secured preferably by molding therein. One piece 71 is adapted to bridge the upper pair of the contacts 66 of the stationary contact block, and the other piece 72 is adapted to bridge the lower pair of the stationary contacts 66 of the stationary contact block.

If the return spring 50 is relatively light so as to exert a force insignificant in comparison with that exerted by expansion of the fluid medium within the bellows 15, the axial dimension between the base 73 of the bellows closure cup 22 and the securing stud 21 depends almost wholly upon the temperature of the medium in which the casing 13 is mounted. The temperature at which the leaf-spring 38 is snapped outward from the inward bowed position illustrated is determined by the rotary adjustment of the inner connecting stem 48 on the threaded push rod 23. When this temperature is attained, the shoulder 52 presses against the leaf-spring 38. Owing to the fact that it is under compression as a column spring, snap-action is obtained, and the contacts made by the movable contact block 39 are abruptly opened, while those of the movable contact block 40 are abruptly closed. No further action takes place as the temperature rises. However, if the temperature falls again below the predetermined value at which the apparatus is set, the shoulder 58 of the dial stem 53 bears inwardly against the outer surface of the lead-spring 38 causing the leaf-spring 38 to bow back into the position illustrated, thereby restoring the original electrical connections again with a snap-action. If a different operating temperature is desired, the pointer 61 is rotated so as to change the distance between the shoulder 52 and the head 51 of the operating rod assembly. If it is desired to extend the operating range of the apparatus beyond that provided by the length of thread in the bore 49 of the connecting stem 48 means may be provided for further compressing the spring 50.

Preferably the switch expanding arms 43 and 44 are arranged to straddle the push rod assembly or are provided with openings 74 large enough to permit the stem members 48 and 53 to move freely with respect to the arms 43 and 44. The dimensions are such that whichever of the resilient contact arms 43 or 44 is carrying the closing movable contacts is bent to insure adequate pressure and good electrical contact. For example, with the contact blocks 36 and 39 in the position illustrated to form circuits between the contacts, the leaf-spring 38 rotates the upper end of the switch arm 43 so as to force the lower end of the arm 43 to be bent backwards with respect to the upper end, thus placing the arm 43 under bending stress and insuring good electrical contact of the contacts in the blocks 36 and 39.

Although, for the sake of illustration, a double-pole, double-throw, double-break electrical switch mechanism has been shown in the drawing and described, it to be understood that my invention is not limited to electrical apparatus controlled by a thermostatic bellows nor is my invention limited to the specific form of electrical switch shown and described.

For example, if only a single-throw switch is needed, one or the other of the switch arms 43 or 44 and associated contact elements are omitted. The apparatus as described in connection with Fig. 1 is a positive-acting switch which makes or breaks contact whenever temperature rises or falls through the predetermined critical value for which the pointer 61 is set. However, my invention also embraces overload or underload cut-outs or temperature limit switches. For example, if the apparatus is to be arranged for breaking an electric water heater circuit controlled by the contacts carried in the blocks 36 and 39 when the temperature in the tank 11 exceeds a predetermined value, the switch arm 44 is omitted, and the leaf-spring retracting means are omitted. Merely by assembling the apparatus without the spring 50, a limit switch is produced in which attainment of a predetermined temperature bows the leaf-spring 38 outwardly so as to open one set of contacts, and if desired, to close an alarm circuit through the other set of contacts, and leaves the swtich means in this position regardless of subsequent reduction in temperature of the medium 17 in the tank 11 causing the bellows 15 to contract.

Overload cut-out or limit switch operation may also be obtained where the spring 50 is of such force as to modify the action of the bellows 15 and is depended upon for producing a predetermined temperature setting of the bellows 15. In this case, the dial stem 53 is arranged with the shoulder 58 sufficiently far to the right of the outer surface of the leaf-spring 38 to avoid retracting the spring 38 to the leftwardly bowed position in which it is illustrated when the bellows 15 contracts upon the falling temperature.

Resetting of the limit switch is accomplished in the arrangement of Fig. 1, when the spring 50 is omitted, by pressing inwardly on the end of the dial stem 53 so as to cause the shoulder 58 to bear against the outer surface of the leaf-spring 38 and restore it to the leftwardly bowed position in which it is illustrated in the drawing.

For resetting the limit switch illustrated in Fig. 3, which is assumed to have a compression spring corresponding to the spring 50, retracting the connector stem 48 with reduction of temperature, an axially slideable sleeve 75 is mounted upon a dial stem 53' for carrying the dial 61. The inner end of the sleeve 75 is provided with an inwardly extending flange 76, adapted to bear against the outer surface of the leaf-spring 38 and serving to limit an outward movement of the sleeve 75 so as to avoid loss of the dial 61. In order to enable the effective length of the connecting rod assembly to be adjusted by rotation of the connector stem 48 through rotation of the dial 61, the sleeve 75 is preferably provided with a longitudinal slot 77 and a pin 78 adapted to pass through the slot 77 is secured in the neck 54 of the connector stem 48. In this manner, a rising temperature, causing expansion of the bellows 15 against the force of a spring 22, serves to press the shoulder 52 of the connector stem 48 against the leaf-spring 38 to throw it outwardly for opening the contacts illustrated, or if desired, for closing a set of contacts corresponding to the contacts carried in the blocks 40 and 37 of Fig. 1. Although, upon falling temperature, the stem 48 may be retracted, it is free to do so without retracting the sleeve 75 and redeflecting the spring 38. Resetting, however, may be accomplished by pressing the dial 61 to the left.

If it should be necessary to replace either the switch mechanism in the frame 14 or the bellows 15, this may readily be done by making a slight left turn of the frame 14 whereby the button-hole eyelets 29 are disengaged from the heads 27 of the pins 26. The bellows 15 may be removed by rotating it to the left to disengage the threaded stud 21. It is unnecessary to remove the well or bellows casing 13 or to interfere in any way with the union between the casing 13 and the tank wall 11.

While I have described my invention as embodied in concrete form and as operating in a specific manner in accordance with the provisions of patent statutes, it should be understood that I do not limit my invention thereto since various modifications thereof will suggest themselves to those skilled in the art without departing from the spirit of my invention, the scope of which is set forth in the annexed claims.

What I claim is:

1. A thermostatic electrical switch comprising in combination an open-ended well adapted to be exposed to the temperatures to which the switch is intended to be responsive, a sealed hollow expansible member secured within said well, containing a temperature-responsive expansible fluid and having a cup-shaped inwardly extending closure at the end of said member toward the open end of the well, a switch frame removably secured to the well at the open end thereof, said switch frame having spaced first and second plate members with openings coaxial with said well, the first of which is closer to the said well, a push rod having a head in the bottom of said closure cup and a threaded end extending through the opening in said first frame plate member, a compression spring surrounding said rod between said head and said first frame plate member, a stressed column leaf spring mounted in said frame transversely to said rod whereby it has position of rest bowed either toward or away from said expansible hollow member, movable switch-contact carrying blades secured to said leaf-spring on either side thereof, stationary contacts secured to said frame to cooperate with said switch blades for closing one or the other of said sets of contacts according to the position of the leaf-spring, said leaf-spring having a central opening, a connector rod having a narrow portion extending through said leaf-spring opening, and a larger portion forming a shoulder adapted to bear against the inner surface of said leaf-spring, said larger portion having a threaded bore adjustably secured upon the threaded end of said push rod, an adjustment stem secured to said connector rod coaxially therewith, extending through the opening in said second frame plate member and having a shoulder adapted to bear against the outer surface of the leaf-spring, a dial and a pointer, one of the latter two elements being secured to said adjustment stem, and the other of said latter two elements being secured to said second frame plate member whereby rotation of said adjustment stem varies the axial distance between said head and said shoulder to adjust the operating temperature of said switch.

2. A thermostatic electrical switch comprising in combination an open ended well adapted to be exposed to the temperatures to which the switch is intended to be responsive, a sealed hollow expansible member secured within said well, containing a temperature-responsive expansible fluid and having a cup-shaped inwardly extending closure at the end of said member toward the open end of the well, a switch frame removably secured to the well at the open end thereof, said switch frame having an opening toward the said well, a push rod having a head in the bottom of said closure cup and a threaded end extending through the opening in said frame, an abutment on said frame, a compression spring surrounding said rod between said head and said frame abutment, a stressed column leaf-spring mounted in said frame transversely to said rod whereby it has position of rest bowed either toward or away from said expansible hollow member, movable switch-contact carrying blades secured to said leaf-spring on either side thereof, stationary contacts secured to said frame to cooperate with said switch blades for closing one or the other of said sets of contacts according to the position of the leaf-spring, said leaf-spring having a central opening, a connector rod having a narrow portion extending through said leaf-spring opening, and a larger portion forming a first-shoulder adapted to bear against the inner surface of said leaf-spring, said larger portion having a threaded bore adjustably secured upon the threaded end of said push rod, an adjustment stem secured to said connector rod coaxially therewith, having a second shoulder adapted to bear against the outer surface of the leaf-spring, a dial and a pointer, one of the latter two elements being secured to said adjustment stem, and the other of said latter two elements being secured to said frame whereby rotation of said adjustment stem varies the axial distance between said head and said first shoulder to adjust the operating temperature of said switch.

3. A thermostatic electrical switch comprising in combination an open ended well adapted to be exposed to the temperatures to which the switch is intended to be responsive, a sealed hollow expansible member secured within said well, containing a temperature-responsive expansible fluid and having a cup-shaped inwardly extending closure at the end of said member toward the open end of the well, a switch frame removably secured to the well at the open end thereof, said switch frame having an opening toward the said well, a push rod having an inner end in the bottom of said closure cup and a threaded end extending through the opening in said frame, means for resiliently urging said inner rod end against said closure cup, a stressed column leaf-spring mounted in said frame transversely to said rod whereby it has a position of rest bowed either toward or away from said expansible hollow member, movable switch-contact carrying blades secured to said leaf-spring on either side thereof, stationary contacts secured to said frame to cooperate with said switch blades for closing one or the other of said sets of contacts according to the position of the leaf-spring, a connector, a dial and a pointer, said connector having a first shoulder adapted to bear against the inner surface of said leaf-spring, a second shoulder spaced from the first adapted to bear against the outer surface of the leaf-spring and a threaded bore adjustably secured upon the threaded end of said push rod, one of the two elements comprising the dial and the pointer being secured to said connector and the other of said latter two elements being secured to said frame whereby rotation of said connector varies the axial distance between said inner rod end and said first shoulder to adjust the operating temperature of said switch.

4. A temperature cut-out comprising in combination a switch frame having a stem extending therethrough, a leaf-spring mounted in said frame transversely to said stem and stressed sufficiently to bow the spring, said stem having means for engaging said leaf-spring on either side thereof, a temperature-responsive expansible member adapted to bear against the end of said stem for driving the leaf-spring from one bowed position to an opposite bowed position in response to temperature variation of the expansible member, and switch contact means carried by said leaf-spring having a circuit closing position with the leaf-spring in a bowed position toward the expansible member and a circuit opening position in the bowed position of said leaf-spring away from the said expansible member, one of said leaf-spring engaging means serving to drive the bowed spring to the circuit opening position and the other serving to return it to the circuit closing position.

5. A temperature cut-out comprising in combination a switch frame having a stem extending therethrough, a leaf-spring mounted in said frame transversely to said stem and stressed sufficiently to bow the spring in one or the other of two positions, said stem having means for engaging said leaf-spring, a temperature-responsive expansible member adapted to bear against the end of said stem for driving the leaf-spring from one bowed position to an opposite bowed position in response to temperature variation of the expansible member and switch contact means carried by said leaf-spring having a circuit closing position with the leaf-spring in one of its bowed positions and a circuit opening position in the other bowed position of said leaf-spring.

6. A limit switch comprising in combination a switch frame having a stem extending therethrough, a leaf-spring mounted in said frame transversely to said stem and stressed sufficiently to bow the spring, said stem having shoulders on either side of said leaf-spring for engaging said leaf-spring, a movable member, the action of which is to be limited, having means adapted to bear against the end of of said stem for driving the leaf-spring from one bowed position to an opposite bowed position in response to action of a predetermined magnitude by said member and switch contact means carried by said leaf-spring having a circuit closing position with the leaf-spring in one of its bowed positions, one of said stem shoulders serving to drive the bowed spring to the circuit opening position and the other serving to return it to the circuit closing position.

7. A thermostatic electrical switch comprising in combination a temperature-responsive movable member, a push rod having an end against which said temperature-responsive movable member is adapted to bear and a threaded opposite end, means for resiliently urging said first end against said temperature-responsive movable member, a stressed column leaf-spring mounted transversely to said rod whereby it has a position of rest bowed either toward or away from said temperature responsive movable member, movable switch contact carrying blades composed of resilient strip material secured to said leaf-spring on either side thereof, stationary contacts mounted in such relation to said leaf-spring that whichever of the movable switch contact carrying blades is making contact with the stationary contacts in one of the bowed positions of said leaf-spring is subjected to bending stress, a connector rod, a dial and a pointer, said connector rod having a first shoulder adapted to bear against inner surface of said leaf-spring, a second shoulder adapted to bear against the outer surface of the leaf-spring and a threaded bore adjustably secured upon the threaded end of said push rod, one of the two elements comprising the dial and the pointer being secured to one of said rods and the other of said latter two elements having a stationary mounting whereby relative rotation of said rods varies the axial distance between said first push rod end and said first shoulder to adjust the operating temperature of said switch.

8. A thermostatic electrical switch comprising in combination a temperature-responsive movable member, a push rod having an end against which said temperature-responsive movable member is adapted to bear and a threaded opposite end, means for resiliently urging said first end against said temperature-responsive movable member, a stressed column leaf-spring mounted transversely to said rod whereby it has a position of rest bowed either toward or away from said temperature-responsive movable member, movable switch contact carrying blades composed of resilient strip material secured to said leaf-spring on either side thereof, stationary contacts mounted in such relation to said leaf-spring that whichever of the movable switch contact carrying blades is making contact with the stationary contacts in one of the bowed positions of said leaf-spring is subjected to bending stress, and a connector rod having a first shoulder adapted to bear against inner surface of said leaf-spring, a second shoulder adapted to bear against the outer surface of the leaf-spring and a threaded bore adjustably secured upon the threaded end of said push rod, whereby relative rotation of said rods varies the axial distance between said first push rod end and said first shoulder to adjust the operating temperature of said switch.

9. A thermostatic electrical switch comprising in combination a temperature-responsive movable member, a push rod, a stressed column spring mounted transversely to said rod whereby it has a position of rest bowed either toward or away from said temperature-responsive movable member, movable switch contact carrying blades composed of resilient strip material secured to said spring, and stationary contacts mounted in such relation to said spring that the movable switch contact carrying blades making contact with the stationary contacts in one of the bowed positions of said spring is subjected to bending stress, said push rod having means adapted to bear oppositely against said temperature-responsive movable member and said column spring.

10. A thermostatic electrical switch comprising in combination a temperature-responsive movable member, a support therefor, a switch frame, a quick-lock attaching and detaching means on said support and said switch frame of the type comprising a cooperating bolt-head and key-hole slot, a switch operating stem having an end against which said temperature-responsive movable member is adapted to bear, a stressed column leaf-spring mounted in said frame transversely to said stem whereby it has a position of rest bowed either toward or away from said temperature-responsive movable member, movable switch contact means resiliently secured to said leaf-spring, stationary contact means secured to said frame to cooperate with said movable switch contact means for opening or closing electrical contacts according to the position of the leaf-spring, said stem having a first shoulder adapted to bear against the inner surface of said leaf-spring, a second shoulder spaced from the first adapted to bear against the outer surface of the said leaf-spring and means for resiliently urging said stem against said temperature-responsive movable member.

11. A thermostatic electrical switch comprising in combination a temperature-responsive movable member, a support therefor, a switch frame, a quick-lock attaching and detaching means on said support and said switch frame, a switch operating stem having an end against which said temperature-responsive movable member is adapted to bear, a stressed column leaf-spring mounted in said frame transversely to said stem whereby it has a position of rest bowed either toward or away from said temperature-responsive movable member, movable switch contact means resiliently secured to said leaf-spring, stationary contact means secured to said frame to cooperate with said movable switch contact means for opening or closing electrical contacts according to the position of the leaf-spring, said stem having a first shoulder adapted to bear against the inner surface of said leaf-spring, a second shoulder spaced from the first adapted to bear against the outer surface of the said leaf-spring and means for resiliently urging said stem against said temperature-responsive movable member.

12. A thermostatic electrical switch comprising in combination a temperature-responsive movable member, a support therefor, a switch frame, a quick-lock attaching and detaching means on said support and said switch frame, a switch operating stem having an end against which said temperature-responsive movable member is adapted to bear, a stressed column leaf-spring mounted in said frame transversely to said stem whereby it has a position of rest bowed either toward or away from said temperature-responsive movable member, movable switch contact means resiliently secured to said leaf-spring, stationary contact means secured to said frame to cooperate with said movable switch contact means for opening or closing electrical contacts according to the position of the leaf-spring, said stem having a first shoulder adapted to bear against the inner surface of said leaf-spring, and a second shoulder spaced from the first adapted to bear against the outer surface of the said leaf-spring.

13. A thermostatic electrical switch comprising in combination a temperature-responsive movable member, a support therefor, a switch frame, a quick-lock attaching and detaching means on said support and said switch frame, a switch operating stem having an end against which said temperature-responsive movable member is adapted to bear, a stressed column leaf-spring mounted in said frame transversely to said stem whereby it has a position of rest bowed either toward or away from said temperature-responsive movable member, movable switch contact means operatively connected mechanically to said leaf-spring, stationary contact means secured to said frame to cooperate with said movable switch contact means for opening or closing electrical contacts according to the position of the leaf-spring, said stem having means adapted to bear against the inner surface of said leaf-spring.

14. A thermostatic electrical switch comprising in combination a temperature-responsive movable member, a support therefor including a casing with an open end, a switch frame, a quick-lock attaching and detaching means on said support and said switch frame for detachably securing said frame to said support at the open end of said casing, a switch operating stem having an end against which said temperature-responsive movable member is adapted to bear along a line passing through the open end of said casing, a snap-action device mounted in said frame having a position of rest either toward or away from said temperature-responsive movable member, movable switch contact means operatively connected mechanically to said snap-action device, stationary contact means secured to said frame to cooperate with said movable switch contact means for opening or closing electrical contacts according to the position of the snap-action device, said stem having means adapted to bear against the said snap-action device.

STEHMAN S. MINNICH.

REFERENCES CITED

The following references are of record in the file of this patent:

UNITED STATES PATENTS

| Number | Name | Date |
| --- | --- | --- |
| 2,013,435 | Dobler et al. | Sept. 3, 1935 |
| 2,077,362 | Holm | Apr. 13, 1937 |
| 2,110,674 | Miller et al. | Mar. 8, 1938 |
| 2,113,495 | Richmond | Apr. 5, 1938 |